United States Patent [19]

Titus

[11] Patent Number: 4,576,077

[45] Date of Patent: Mar. 18, 1986

[54] SPRING-BIASED TENSIONING DEVICE FOR A BAND SAW BLADE

[75] Inventor: Timothy C. Titus, Three Rivers, Mich.

[73] Assignee: Wells Manufacturing Corporation, Three Rivers, Mich.

[21] Appl. No.: 647,142

[22] Filed: Sep. 4, 1984

[51] Int. Cl.<sup>4</sup> .................. B23D 55/06; B23D 55/10
[52] U.S. Cl. ..................................... 83/816; 83/700
[58] Field of Search ............................. 83/816–819, 83/700; 30/380; 474/113; 198/816

[56] References Cited

U.S. PATENT DOCUMENTS 3,889,567 6/1975 Sato et al. .................. 83/818

Primary Examiner—James M. Meister
Attorney, Agent, or Firm—Dressler, Goldsmith, Shore, Sutker & Milnamow, Ltd.

[57] ABSTRACT

A blade tensioning mechanism for a band saw is provided with a block slidably mounted on the saw frame and carrying a movable, non-driven, (i.e., idler) band saw blade wheel. A link is threaded to the block and extends through a housing having three coaxially aligned bores, one of which is internally threaded. A handle is secured to one end of the link adjacent the housing. A thrust bearing and externally threaded collar are disposed on the link in the housing with the thrust bearing located between the collar and the link handle. The collar has a slotted keyway for receiving a pin projecting radially from the link. A compression spring is disposed in the housing with one end against the collar and the other end against a retainer member threadingly engaged with the housing. The saw blade is tensioned to a predetermined amount by turning the handle to move the block along the link relative to the frame.

17 Claims, 8 Drawing Figures

U.S. Patent  Mar. 18, 1986  Sheet 1 of 3  4,576,077
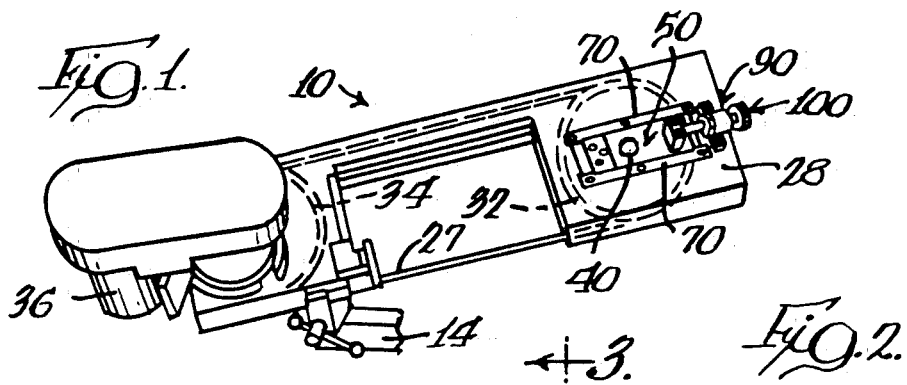
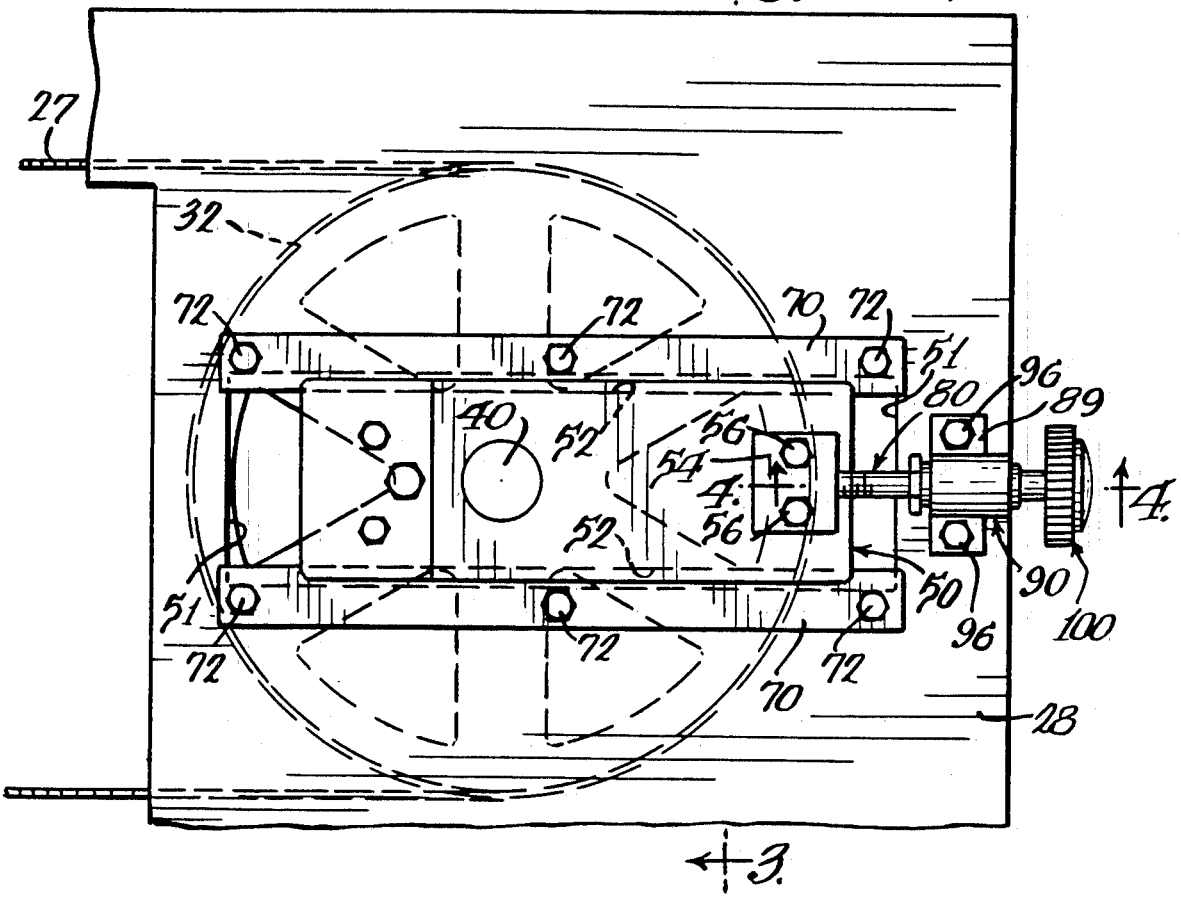
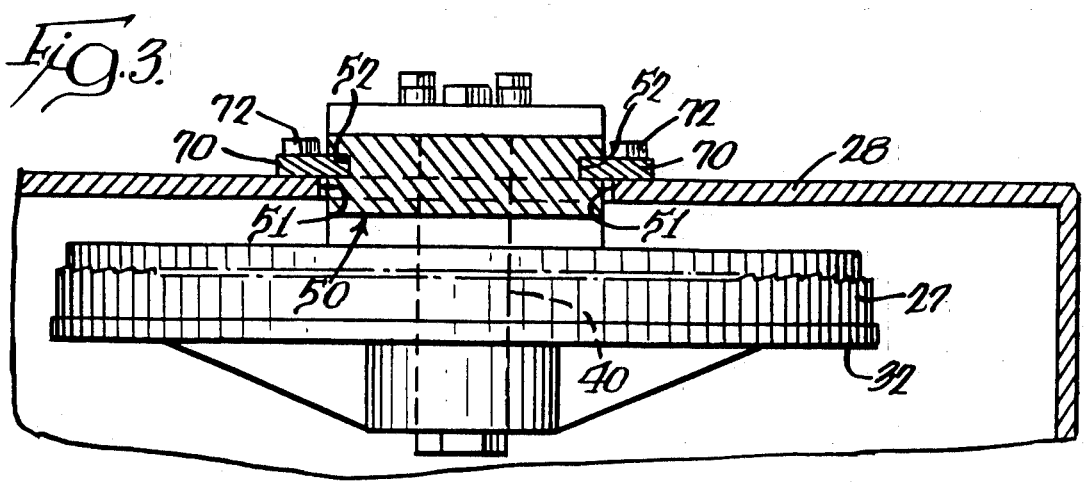

SPRING-BIASED TENSIONING DEVICE FOR A BAND SAW BLADE

DESCRIPTION

1. Technical Field

This invention relates to band saws and to an improvement for tensioning the band saw blade.

2. Background of the Invention

A characteristic feature of a band saw is the continuous loop saw blade which is typically carried on spaced-apart pulleys or band wheels. The band wheels are mounted to a frame for rotation, and one of the wheels is rotatably driven by a suitable motor for moving the saw blade so as to cut a workpiece.

Typically, the band wheels are mounted in a common plane and rotate about parallel axes. Further, one of the band wheels is preferably movable relative to the other for increasing the distance between the two wheels and hence, for tensioning the continuous loop saw blade entrained thereabout.

The band wheel that is not connected to the drive motor is connected to a shaft carried on the frame and mounted for movement relative to the frame. In one typical conventional design, the movement is effected through a handle-operated rod which is directly or indirectly threadingly engaged with the frame at one end and which is secured at the other end to a block or plate to which the movable band wheel shaft is mounted. The block or plate, in turn, is mounted in guides for sliding relative movement with respect to the frame. Thus, rotation of the handle in one direction will move the plate-mounted band wheel further from the fixed, motor-driven band wheel and increase the tension in the band saw blade, whereas rotation of the handle in the opposite direction will move the plate-mounted band wheel closer to the fixed, motor driven band wheel and reduce the tension in the band saw blade.

In the past, tightening of a band saw blade, by moving one of the band wheels relative to the other band wheel with a threaded adjustment mechanism as described above, could also cause an overtightening of the saw blade and a warping of the band saw frame.

Thus, it would be desirable to provide a mechanism that would prevent overtightening of a band saw blade while accommodating the variable frictional resistance to band wheel movement that results from accumulation of dirt and other material on the band saw.

Further, it would be desirable to provide a mechanism by which a predetermined amount of final tension could be applied to the band saw blade—a predetermined amount of tension which would be generally repeatable each time the saw blade was tensioned.

One design for an improved band saw blade tensioning mechanism is disclosed in the U.S. Pat. No. 4,311,074. The design includes both a rotatable handle and a lever-operated cam in conjunction with a cam follower for effecting a higher, final tension. Such a mechanism works well with a variety of saws for which the cam surfaces are specifically designed. However, it would be desirable to provide a tensioning mechanism that would eliminate the need to design and fabricate specific cam surfaces. It would also be advantageous to provide a mechanism that would not require the manipulation of two different handles or levers to effect final tension. Additionally, it would be beneficial if the mechanism could be readily adaptable for use with a variety of band saws of different sizes.

SUMMARY OF THE INVENTION

The present invention provides an improved blade tensioning mechanism for a band saw having a frame, spaced-apart band wheels rotatably mounted on the frame in a common plane of rotation for carrying an endless saw blade, and a blade motor operably associated with one of the band wheels. At least one non-driven or idler band wheel is mounted for movement in the plane of rotation relative to the motor driven band wheel.

The blade tensioning mechanism is associated with a non-driven or idler band wheel and provides displacement of the idler band wheel towards the motor driven band wheel to release tension on the endless band saw blade as well as displacement of the idler band wheel away from the motor driven band wheel to tension the endless band saw blade.

According to the preferred embodiment of the present invention, the movable idler band wheel is rotatably mounted on a sliding block which, in turn, is slidably mounted to the band saw frame.

A link is threadingly connected with the block and a biasing means is provided for biasing the link to a first axial position relative to the frame.

An engaging means is provided for engaging the link with the frame independently of the biasing means at and beyond a second axial position of the link relative to the frame to accommodate a predetermined amount of axial displacement of the link relative to the frame from the second axial position to a third axial position.

A limit means is provided for limiting the amount of axial displacement of the link relative to the frame at the third axial position whereupon rotation of the link in one direction at the third axial position effects movement of the block relative to the link to increasingly tension the saw blade.

A restraint means is provided for preventing the rotation of the link in the one direction after a predetermined amount of rotation of the link has occurred at the third axial position.

Numerous other advantages and features of the present invention will become readily apparent from the following detailed description of the invention, from the claims and from the accompanying drawings.

BRIEF DESCRIPTION OF THE DRAWINGS

In the accompanying drawings forming part of the specification and in which like numerals are employed to designate like parts throughout the same, FIG. 1 is a fragmentary, perspective view of a band saw embodying the present invention;

FIG. 2 is an enlarged, fragmentary plan view of the band saw showing the end of the band saw containing the movable band wheel and saw blade tensioning mechanism in an initial position;

FIG. 3 is a fragmentary, cross-sectional view taken generally along the plane 3—3 in FIG. 2;

DESCRIPTION OF THE PREFERRED EMBODIMENT

Figure 4:
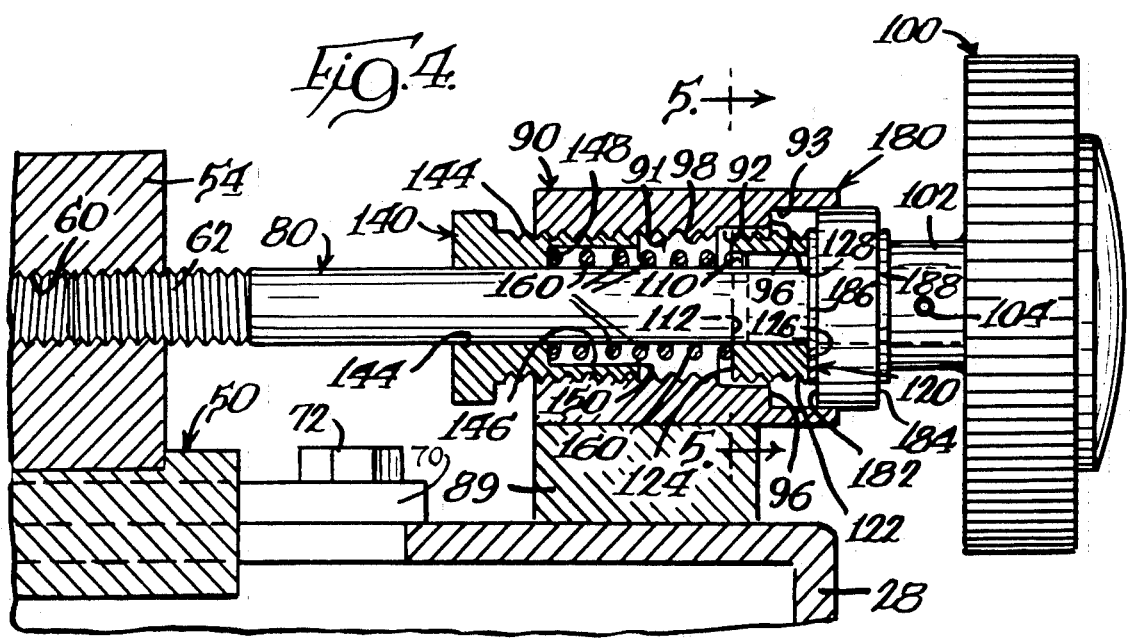
FIG. 4 is a greatly enlarged, cross-sectional view of the tensioning mechanism.

While this invention is susceptible of embodiment in many different forms, one specific embodiment is described in detail. It is to be understood, however, that the present disclosure is to be considered as an exemplification of the principles of the invention and is not intended to limit the invention to the embodiment described. The precise shapes and sizes of the components herein described are not essential to the invention unless otherwide indicated.

The band saw with which the tensioning mechanism of the present invention is associated may have certain conventional drive mechanisms and control mechanisms the details of which, though not fully illustrated or described, will be apparent to those having skill in the art and an understanding of the necessary functions of such mechanisms.

For ease of description, the mechanism of this invention will be described in one position on a band saw and terms such as upper, lower, horizontal, etc. are used with reference to this one position. It will be understood, however, that the mechanism of this invention may be manufactured, stored, transported, sold, and used in an orientation other than the one position described.

The specific materials of construction for the various mechanical elements of the present invention may be dependent upon the particular application involved and other variables, as those skilled in the art will appreciate.

Referring now to FIG. 1, the head of a band saw 10 is illustrated as being supported from a member 14 that is carried on a conventional stationary or movable base (not illustrated).

The saw 10 has a frame 28, and a continuous loop band saw blade 27 is rotatably supported on the frame 28 in the conventional manner around spaced apart pulleys or band wheels 32 and 34 which are carried by frame 28. The band wheels 32 and 34 are mounted in common plane and are adapted to be rotated about parallel axes which are perpendicular to that common plane. One of the band wheels, 34, is driven by means of a motor 36 also mounted on frame 28.

In the embodiment illustrated, only two band wheels are provided. It is to be realized, however, that additional band wheels, such as additional idler wheels, could also be provided.

The motor driven band wheel 34 is fixed relative to the frame 28 but the band wheel 32 is mounted for movement in the plane of rotation and relative to the motor driven band wheel 34 for tensioning the endless saw blade 27. To this end, movable band wheel 32 is mounted for rotation about shaft 40 which is carried in block 50, which in turn, is slidably disposed in an opening 51 on frame 28.

The block 50 defines a pair of parallel, aligned channels 52 along its lateral sides for receiving guide track members 70 as best illustrated in FIGS. 2 and 3. Each track member 70 is secured to the frame 28 by suitable means, such as machine screws 72. The track members 70 function as guide means for guiding the movement of the block 50 in the opening 51 along a plane parallel to the plane of rotation of the band wheels 32 and 34 and for restraining the block 50 against displacement in directions out that plane of movement.

As best illustrated in FIGS. 2 and 4, the block 50 includes a link receiving portion 54. The receiving portion 54 may be a unitary part of the block 50 or may be a separate member suitably secured to the block 50, such as by means of machine screws 56 illustrated in FIG. 2. The receiving portion 54 of the block 50 defines an internally threaded bore 60 as best illustrated in FIG. 4. The threaded bore 60 is adapted to receive in threaded engagement a thread 62 on one end of a generally cylindrical link 80.

Figure 5:
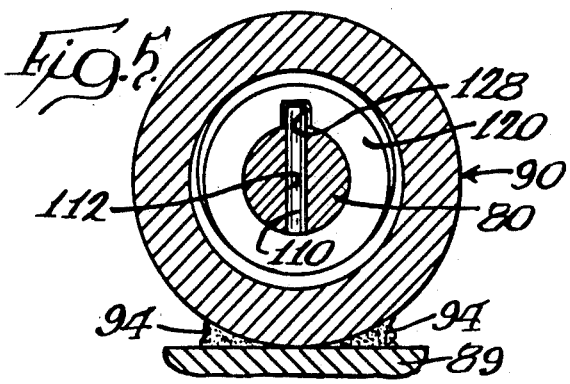
FIG. 5 is a further enlarged, fragmentary, cross-sectional view taken generally along the plane 5—5 in FIG. 4.

As best illustrated in FIGS. 2, 4 and 5, a housing 90 is carried on the frame 28 in spaced relationship from the block 50 for receiving at least a portion of the length of the link 80. The housing 90, in the particular embodiment illustrated in the Figures, is secured directly to a plate 89 with welds 94 (FIG. 5), and the plate 92 is secured with machine screws 96 (FIG. 2) to the frame 28.

The housing 90 defines a first bore 91, a second bore 92, and a third bore 93. The bores 91, 92, and 93 are coaxially aligned with the threaded bore 60 of the block 50. The second bore 92 communicates at one end with the first bore 91 and at the other end with the third bore 93. The third bore 93 has a larger diameter than the second bore 92 so as to define an annular shoulder 96 around the second bore 92.

The housing 90 defines an internal thread 98 in the first bore 91. In the illustrated embodiment, the second bore 92 and the third bore 93 are devoid of internal threads, and the maximum diameter of the first bore internal thread 98 is substantially equal to the diameter of the second bore 92. If desired, however, the second bore 92 may have a diameter somewhat larger than the maximum diameter of the first bore internal thread 98.

As best illustrated in FIGS. 4 and 5, the link 80 extends through the first bore 91, through the second bore 92, and through the third bore 93. The end of the link 80 that is not engaged with the block receiving member 54 is disposed in or beyond the third bore 93 of the housing 90. A handle or knob 100 is provided with a hub portion 102 for receiving an end of the link 90 and for being secured thereto with a roll pin 104.

Within the housing 90, a drive pin 110 is mounted to the link 80 as best illustrated in FIGS. 4 and 5. The pin 110 is disposed in a bore 112 in the link 80 and extends diametrically through the link 80. The pin 110 projects at one end beyond the circumferential periphery of the link 80. The drive pin 110 need not be frictionally retained in, or otherwise fixedly secured to, the link 80. The drive pin 110 may be loosely disposed within the bore 112 but retained on the link 80 by a collar 120 which will next be described.

The collar 120 is disposed on the link 80 to accommodate axial movement within the bores of the housing 90. The collar 120 has a generally hollow configuration with a cylindrical periphery having an external thread 122 for engaging the internal thread 98 in the housing first bore 91.

The collar 120 has oppositely facing first and second annular end surfaces 124 and 126, respectively. The collar 120 also defines a channel 128 oriented generally longitudinally of the collar and opening inwardly to the hollow interior of the collar for receiving the projecting drive pin 110. Thus, rotation of the link 80 will cause rotation of the collar 120 by virtue of the engagement of the drive pin 110 with a side wall of the collar channel 128.

Although the drive pin 110 is illustrated as being a separate element, other designs may be employed. For example, the drive pin may be unitary with the link 80 and may have the form of a suitably shaped member projecting from the cylindrical periphery of the link.

An adjustable retainer and stop member 140 is provided with a external thread 142 for engaging the internal thread 98 of the housing first bore 91. The retainer and stop member 140 defines a first bore 144 and a second bore 146. The first bore 144 and the second bore 146 are coaxially aligned with the link 80, and are each adapted to receive the link 80 in generally axial alignment.

The retainer and stop member 140 is disposed with the member first bore 144 closer to the block bore 60 than is the member second bore 146. The member second bore 146 is concentrically oriented with the housing first bore 91. Similarly, the member first bore 144 is concentrically oriented with both the housing first bore 91 and with the member second bore 146. The member second bore 146 has a larger diameter than the member first bore 144 to define an annular retaining surface 148 around the member first bore 144. The retainer and stop member 140 also defines a generally annular abutment surface 150 around the member second bore 146 within the housing first bore 91.

A compression spring 160 is disposed around the link 80 within the housing 90 and with one end of the spring abutting the annular retaining surface 148 of the member 140 and with the other end of the spring abutting the collar first end surface 124.

A thrust bearing 180 is disposed on the link 80 in the housing third bore 93 for rotation relative to the link 80. The thrust bearing 180 is adapted to be driven by the link 80 toward the housing annular shoulder 96. To this end, the thrust bearing 180 is disposed between the collar 120 and the handle hub 102. The thrust bearing 180 has on one end a first bearing surface 182 facing toward the housing shoulder 96. On the other end of the thrust bearing 180 there is an oppositely facing second bearing surface 184.

In the embodiment illustrated, a first washer 186 is disposed between the collar 120 and the thrust bearing first end surface 182. Similarly, a second washer 188 is disposed between the thrust bearing second end surface 184 and the handle hub 102. The thrust bearing 180 and the washers 186 and 188 may be loosely disposed on the link 80. The handle hub 102 acts on the thrust bearing 180, through the washer 188, to move the thrust bearing 180 toward the left whenever the link 80 is moved toward the left (as viewed in FIG. 4).

The above-described tensioning mechanism components are easily operated to effect the desired tensioning of the saw blade. When a saw blade is initially placed on the saw band wheels 32 and 34, the saw band wheels 32 and 34 are sufficiently close togetner to accommodate positioning of the saw blade 27 around the periphery of the band wheels 32 and 34. To this end, the slide block 50 would be initially positioned toward the left-hand end of the track members 70 (as viewed in FIGS. 1-4) to the extent necessary for locating the idler band wheel 32 close enough to the driven band wheel 34 for accommodating placement of the saw blade 27 around the two band wheels.

When the tensioning process is initiated, the tensioning mechanism components are disposed generally as illustrated in FIG. 4. Specifically, the compression spring 160 is under little or no compression force, and the collar 120, not yet being engaged with the housing first bore thread 98, is disposed partly in the second bore 92 and partly in the third bore 93. The thrust bearing 180 is spaced away from the housing annular shoulder 96, and the link 80 can be characterized as being at a first axial position relative to the frame 28.

The operator may begin applying tension to the saw blade 27 by rotating the handle or knob 100 to rotate the link 80. This causes the thread 62 on the link 80 to turn relative to the threaded bore 60 in the receiving portion 54 of the sliding block 50. As a result, the sliding block 50 moves toward the housing 90 (away from the driven wheel 34) because the link 80 is initially prevented from moving axially relative to the block 50 by the compression spring 160 which pushes against the link 80 (through the collar 120, washer 186, thrust bearing 180, washer 188, and handle 100). This causes an increasing tension to be applied to the saw blade 27. Thus, the spring 160 functions as a biasing means for biasing the link 80 to the first axial position (relative to the housing 90 and frame 28) as tension is initially applied to the saw blade 27. If desired, washer 186 can be replaced by a spring device, e.g., another compression spring, a so-called Belleville washer, or the like, in order to facilitate the engagement of the male threads 122 on collar 120 with the female thread 98 of the bore 91.

Eventually, the increasing tension in the saw blade 27 overcomes the biasing force of the spring 160. As the spring 160 compresses, the link 80 is axially displaced away from the first axial position (toward the left as viewed in FIG. 4). However, at the same time, the rotating link 80 is threading the link thread 62 further into the receiving portion 54 of the sliding block 50 so that the sliding block 50 now temporarily remains in the same position relative to the frame 28 while the spring 160 is being compressed and while the rotating link 80 is being displaced from the first axial position relative to the frame 28.

Figure 6:
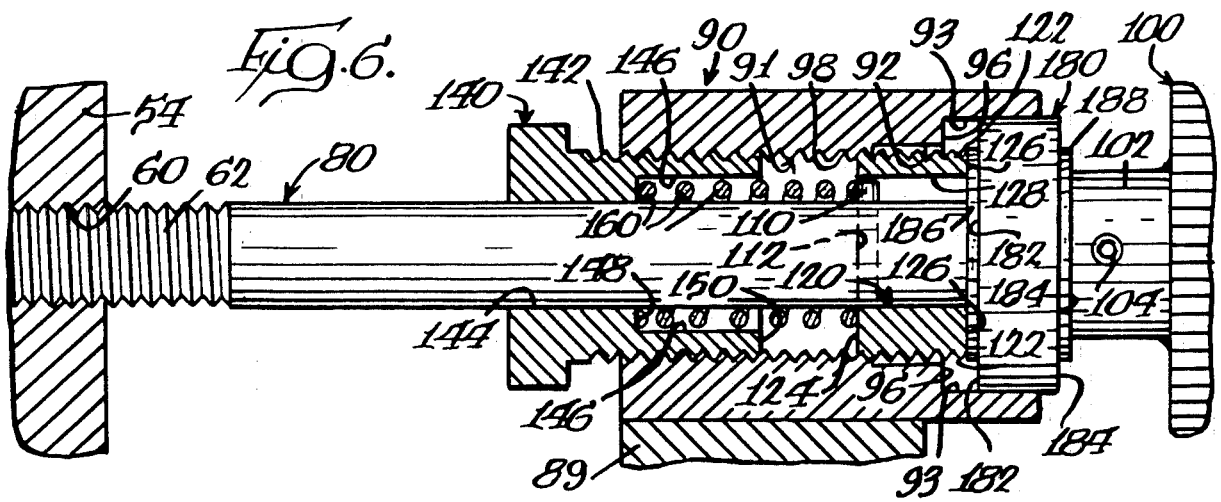
FIGS. 6–8 are views similar to FIG. 4, but slightly enlarged and showing moved positions of certain internal components as a result of an increasingly greater number of rotations of the handle.

As the link 80 rotates, the drive pin 110 necessarily rotates with the link 80. The projecting portion of drive pin 110 that is received in the channel 128 of the collar 120 causes rotation of the collar 120 with the link 80. At the same time, continued rotation of the handle or knob 100 causes sufficient axial displacement of the link 80 relative to the frame 28 and block 50 to initially engage the rotating collar thread 122 with the thread 98 in the housing first bore 91. The transient position of the link 80 at this point may be defined as the second axial position of the link 80 relative to the frame 28, and this second axial position is generally represented by FIG. 6.

As soon as the collar thread 122 engages the thread 98 of the housing 90, the load on the compression spring 160 is isolated and the tension force of the saw blade 27 is transferred from the slide block 50 through the link 80 to the threaded connection between the collar 120 and the housing 90. Thus, the saw blade tension is transferred to the frame 28 independently of the amount of compression of the spring 160.

Continued rotation of the handle 100 causes the collar 120 to be threaded further into the first bore 91 of the housing 90. The link 80, along with the pin 110, collar 120, thrust bearing 180, and handle 100 secured to the link 80, all continue to be axially displaced toward the slide block 50 (to the left as viewed in FIG. 6). The link 80 thus moves away from the second axial position shown in FIG. 6. Although the spring 160 is further compressed, the further compression of the spring 160 has no effect at this point on the saw blade tension since the tension force is still transmitted to the frame 28 through the collar thread 122 and engaged housing thread 98 as explained above.

Figure 7:
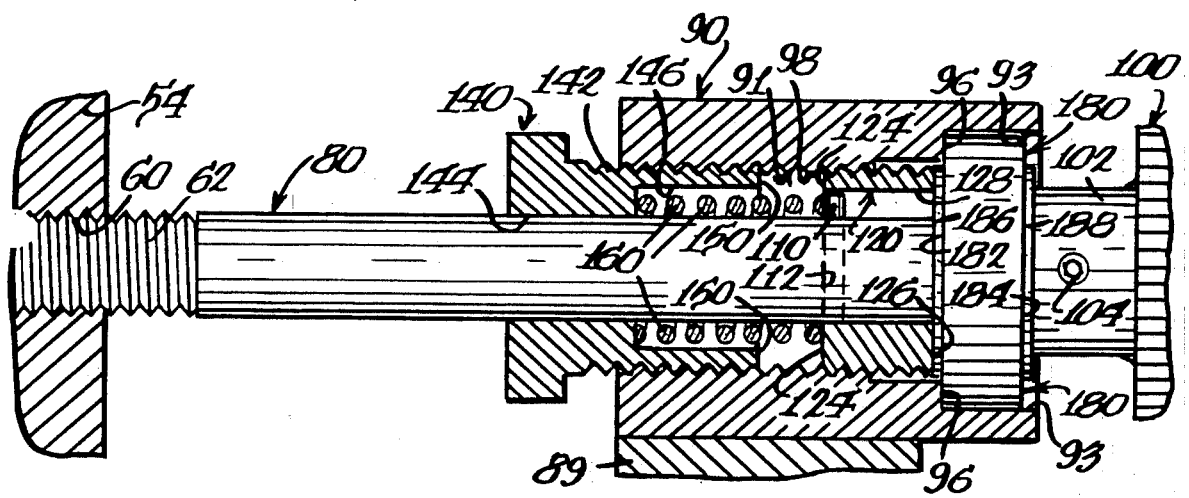

If the link thread 62 has the same or substantially the same pitch as the collar thread 122, then the slide block 50 will continue to remain substantially stationary relative to the frame 28 as the link 80 is threaded further into the slide block receiving member 54. Continued rotation of handle 100 results in continued displacement of the link 80 and components carried thereon toward the slide block 50, without further increasing the saw blade tension, until the first bearing surface 182 of the thrust bearing 180 abuts the annular shoulder 96 of the housing 90 as illustrated in FIG. 7. The position of the link 80 when the thrust bearing 180 abuts the housing shoulder 96 may be defined as a third axial position of the link 80 relative to the frame 28.

The displacement of the link 80 from the second axial position illustrated generally in FIG. 6 to the third axial position illustrated generally in FIG. 7 is thus seen to be effected by a unique combination of components which function as engaging means for engaging the link with the frame 28 at and beyond the second axial position to accommodate a predetermined amount of axial displacement of the link 80 relative to the frame 28 from the second axial position to the third axial position. The engaging means includes the thread 122 on the periphery of the collar 120, the internal thread 98 in the first bore 91 of the housing 90 engaged with the collar thread 122, the radially projecting drive pin 110 on the link 80, and the longitudinal channel 128 defined in the collar 120 for receiving the drive pin 110.

The first bearing surface 182 of the thrust bearing 180 may be characterized as a limit means for limiting the amount of actual displacement of the link 80 relative to the frame 28 at the third axial position (FIG. 7) whereupon rotation of the link 80 in one direction at that third axial position can effect no further displacement of the link 80 relative to the frame 28. Instead, continued rotation of the handle 100 and link 80 effects movement of the slide block 50 relative to the link 80 to increasingly tension the saw blade 27. That is, since the thrust bearing 180 now prevents further movement of the link 80 (toward the left as viewed in FIG. 7), continued rotation of the link 80 necessarily causes the slide block receiving member 54 to become threaded further onto the link 80 and to thereby carry the slide block 50 toward the housing 90. This carries the idler band wheel 32 further away from the driven band wheel 34 to increase the tension on the saw blade 27.

Figure 8:
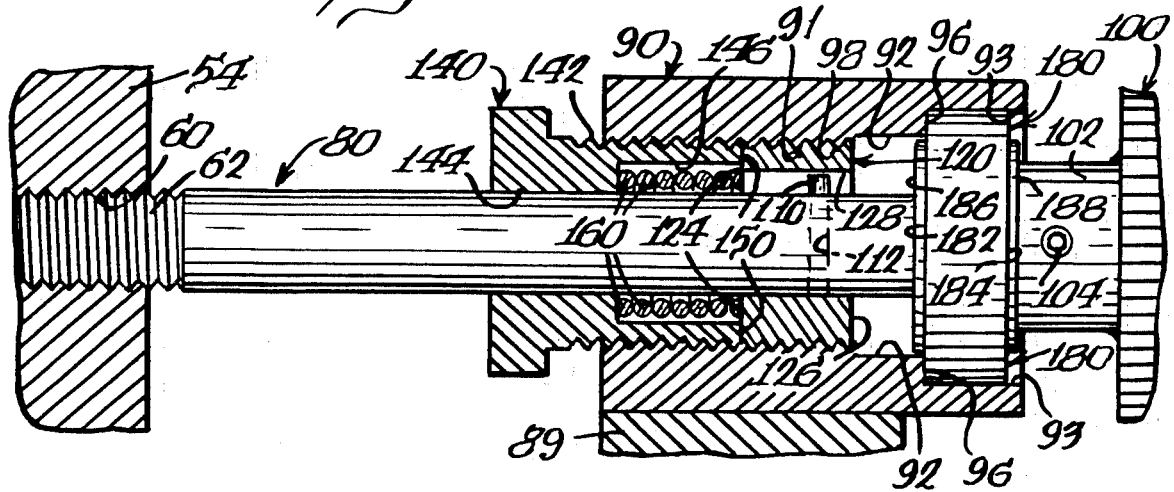

It is to be noted that as the link 80 continues to rotate at the third axial position, the drive pin 110 continues to rotate the collar 120 in threaded engagement with the housing 90 from the position illustrated in FIG. 7 to a final position illustrated in FIG. 8 where the collar first end surface 124 abuts the annular abutment surface 150 of the member 140. At this point, the collar 120 cannot be driven any further (to the left as viewed in FIG. 8) and thus, further rotation of the handle 100 and link 80 is prevented.

The annular abutment surface 150 on the adjustable retainer and stop member 140, together with the first end surface 124 on the pin driven collar 120, may be characterized as a restraint means for preventing the further rotation of the link 80 in one direction after a predetermined amount of rotation of the link 80 at the third axial position. The functioning of the restraint means to prevent further rotation of the handle 100 and link 80 results in terminating the tensioning process.

The maximum tension that can be effected may be conveniently "pre-set" by threading the adjustable retainer and stop member 140 into the housing 90 to a predetermined position. If the member 140 is threaded very far into the housing 90 (to the right as viewed in FIGS. 6-8), then the collar 120 will abut the member 140 after only a relatively small amount of travel resulting in a relatively small amount of final tension applied to the saw blade 27. On the other hand, if the member 140 is screwed into the housing 90 a lesser distance, then the collar 120 will have to travel a greater distance before abutting the member 140 with the result that the final tension on the saw blade 27 would be greater.

An accurate setting of saw blade tension can be obtained by initially backing off the member 140 and rotating the handle 100 to set the desired final tension as directly measured with a conventional saw blade tension measuring device. At the desired final tension, the collar 120 will be located at a particular point along the link 80. The adjustable retainer and stop member 140 is then threaded back into the housing 90 until it abuts the collar 120 at that point. The maximum tension setting is thus fixed by the abutting engagement between the collar 120 and member 140. Thereafter, whenever the saw blade 27 is loosened, or whenever an old blade is replaced with a new blade loosely disposed on the band wheels, the maximum tension may be reapplied by turning the handle 100 until the collar 120 abuts the member 140.

Preferably, the thread 98 in the housing 90, the mating thread 142 on the member 140, and the mating thread 122 on the collar 120 are slightly coarser than the link thread 62 (and the mating thread in the slide block receiving member bore 60). In a preferred embodiment, the housing thread 98 (and the mating threads 142 and 122) has a pitch of 12 threads per inch while the link thread 62 (and the mating thread in the bore 60) has a pitch of 13 threads per inch, or finer, e.g. 20 threads per inch.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a band saw having a frame, spaced-apart band wheels rotatably mounted to said frame in a common plane of rotation and adapted to receive and carry an endless band saw blade thereon, a blade drive means operably associated with one of said band wheels to drive said one band wheel in rotation, and another of said band wheels being an idler wheel and additionally being mounted for movement in said plane of rotation relative to said driven band wheel to tension said endless band saw blade, an improved blade tensioning mechanism which comprises:

a block slidably mounted on said frame and carrying said idler band wheel rotatably mounted thereon, said block defining an internally threaded bore;

a housing carried in fixed relationship on said frame, said housing defining first, second, and third bores coaxially aligned with said block bore, said second bore communicating at one end with said first bore and at the other end with said third bore, said third bore having a larger diameter than said second bore to define an annular shoulder around said second bore, said housing defining an internal thread in said first bore;

an externally threaded link having one end extending into said block bore and threadingly engaged therein with said block, said link extending through said first, second, and third bores of said housing with the other end of said link being disposed adjacent said third bore, said link including a drive pin projecting radially outwardly within said housing;

a handle connected to said other end of said link for rotating said link;

a thrust bearing disposed on said link in said housing third bore for rotation relative to said link and for being driven by said link toward said housing annular shoulder, said thrust bearing having on one end at least a first bearing surface facing toward said housing shoulder;

an adjustable retainer and stop member threadingly engaged with said housing first bore thread, said retainer and stop member defining first and second bores coaxially aligned with said link, said retainer and stop member being disposed with said member first bore closer to said block bore than said member second bore and with said member second bore concentrically oriented within said housing first bore, said member second bore having a larger diameter than said member first bore to define an annular retaining surface around said member first bore, said retainer and stop member also defining a generally annular abutment surface around said member second bore within said housing first bore;

a collar disposed on said link to accommodate axial movement within said housing bores, said collar having a generally hollow configuration with an externally threaded cylindrical periphery for engaging said internal thread in said housing first bore, said collar having oppositely facing first and second annular end surfaces, said collar first end surface being adapted to abut said member abutment surface, said collar second end surface being adapted to bear directly or indirectly against said first bearing surface of said thrust bearing, said collar defining a channel oriented longitudinally of the collar length and opening inwardly to the hollow interior of said collar for receiving said projecting drive pin of said link; and a compression spring disposed around said link within said housing with one end of said spring abutting said member retaining surface and with the other end of said spring abutting said collar first end surface whereby said link can be rotated by said handle to (1) apply an increasing initial tension on said band saw blade in response to the movement of said block along said link toward said handle until said collar overcomes the bias of said spring and engages said housing first bore threads, (2) further thread said collar into said housing first bore against said spring and to thread said link further into said block bore to carry said thrust bearing toward said housing annular shoulder until the axial movement of said rotating link relative to said frame and housing annular shoulder is terminated by the engagement of said thrust bearing with said housing annular shoulder, and (3) subsequently apply an increasing final tension on said saw blade as said block moves along said rotating link toward said handle until said collar abuts said annular abutment surface on said retainer and stop member to prevent further rotation of said link.

2. The improvement in accordance with claim 1 in which said second and third bores are devoid of internal threads and in which the maximum diameter of said first bore internal thread is substantially equal to the diameter of said second bore.

3. The improvement in accordance with claim 1 in which the pitch of the threads on said link and said block is less than the pitch of the threads on said housing first bore and said collar.

4. The improvement in accordance with claim 1 in which said thrust bearing includes a second bearing surface facing oppositely from said first bearing surface, in which said thrust bearing is disposed on said link to permit axial movement along said link, in which said handle includes an engaging surface facing said thrust bearing for indirectly engaging said second bearing surface, and in which a washer is disposed between said handle engaging surface and said second bearing surface.

5. The improvement in accordance with claim 1 further including a washer between said thrust bearing first bearing surface and said collar second annular end surface.

6. The improvement in accordance with claim 1 in which said collar channel extends from said collar first annular end surface to said collar second annular end surface.

7. The improvement in accordance with claim 1 in which said frame includes a guide means for guiding the movement of said block in a plane parallel to the plane of rotation of said band wheels and for restraining said block against movement in directions normal to the direction of movement of said idler band wheel.

8. The improvement in accordance with claim 7 in which said guide means comprises a pair of spaced apart, parallel guide tracks and in which said block defines a pair of parallel aligned channels along its lateral sides for receiving said guide tracks in sliding engagement.

9. In a band saw having a frame, spaced-apart band wheels rotatably mounted to said frame in a common plane of rotation and adapted to receive and carry an endless band saw blade thereon, a blade drive means operably associated with one of said band wheels to drive said one band wheel in rotation, and another of said band wheels being an idler wheel and additionally being mounted for movement in said plane of rotation relative to said driven band wheel to tension said endless band saw blade, an improved blade tensioning mechanism which comprises:

a block slidably mounted on said frame and carrying said idler band wheel rotatably mounted thereon, said block defining an internally threaded bore;

a housing carried in fixed relationship on said frame, said housing defining a shoulder and a passage through the housing aligned with said block bore, said housing also defining a section in said passage with an interior cylindrical configuration having an internal thread;

a retaining surface in said housing passage and spaced from said housing shoulder;

an abutment surface in said housing passage and spaced from said housing shoulder;

an externally threaded link disposed in said housing passage and having one end extending into said block bore and threadingly engaged therein with said block, said link including a drive pin projecting radially outwardly within said housing passage;

a thrust bearing disposed on said link for rotation relative to said link and for being carried by said link toward said housing shoulder, said thrust bearing having on one end at least a first bearing surface facing toward said housing shoulder;

a collar disposed on said link to accommodate axial movement within said housing passage, said collar having an aperture for receiving said link and having an externally threaded cylindrical periphery for engaging said internal thread in said housing passage, said collar having oppositely facing first and second annular end surfaces, said collar first end surface being adapted to abut said abutment surface and said collar second end surface being adapted to bear directly or indirectly against said first bearing surface of said thrust bearing, said collar defining a channel oriented longitudinally of the collar length and opening inwardly to the hollow interior of said collar for receiving said projecting drive pin of said link; and a compression spring disposed around said link within said housing with one end of said spring abutting said retaining surface and with the other end of said spring abutting said collar first end surface whereby said link can be rotated by said handle to tension said band saw blade.

10. The improvement in accordance with claim 9 in which said housing passage comprises first, second, and third coaxially aligned bores with said second and third bores being devoid of internal threads and with said first bore having said housing internal thread.

11. The improvement in accordance with claim 9 in which said mechanism includes an adjustable retainer and stop member threadingly engaged with said housing internal thread, said retainer and stop member defining first and second bores coaxially aligned with said link to accommodate said link, said retainer and stop member being disposed with said member first bore oriented between said block bore and said member second bore, said member second bore having a larger diameter than said member first bore to define said retaining surface as an annulus around said member first bore, said retainer and stop member also defining said abutment surface as an annulus around said member second bore within said housing passage.

12. In a band saw having a frame, a driven band wheel mounted on said frame, and an idler band wheel mounted for movement relative to said driven band wheel to tension said endless band saw blade, an improved blade tensioning mechanism which comprises:

a block slidably mounted on said frame and carrying said idler band wheel rotatably mounted thereon;

a link threadingly connected with said block;

biasing means for biasing said link to a first axial position relative to said frame;

engaging means for engaging said link with said frame independently of said biasing means at and beyond a second axial position of said link relative to said frame to accommodate a predetermined amount of axial displacement of said link relative to said frame from said second axial position to a third axial position;

limit means for limiting the amount of axial displacement of said link relative to said frame at said third axial position whereupon rotation of said link in one direction at said third axial position effects movement of said block relative to said link to increasingly tension said saw blade; and restraint means for preventing the rotation of said link in said one direction after a predetermined amount of rotation of said link at said third axial position.

13. The improvement in accordance with claim 12 in which said block includes an internally threaded bore and in which said link has a thread on an end of said link engaged with said block bore thread.

14. The improvement in accordance with claim 12 in which a housing is carried in fixed relationship on said frame with said housing defining at least a first bore coaxially aligned with said link, in which a collar is provided on said link to accommodate axial movement within said housing first bore, in which said collar has a generally hollow configuration with a cylindrical periphery, and in which said engaging means includes: (a) a thread on said collar periphery, (b) an engageable internal thread in said housing first bore, (c) a radially projecting drive pin on said link, and (d) a longitudinal channel defined in said collar for receiving said drive pin.

15. The improvement in accordance with claim 14 in which a stop member is provided for engagement with said housing and in which said restraint means includes an abutment surface on said stop member and an end surface on said collar adapted to abut said stop member abutment surface.

16. The improvement in accordance with claim 15 in which said biasing means includes a spring disposed between said stop member and said collar.

17. The improvement in accordance with claim 12 in which a housing is carried in fixed relationship on said frame, in which a thrust bearing is disposed on said link in said housing for rotation relative to said link and for being carried by said link toward said block, and in which said limit means includes: (a) an annular shoulder in said housing and (b) at least a first bearing surface on said thrust bearing facing toward said housing shoulder for abutting said shoulder.

* * * * *